United States Patent
Yoo et al.

(10) Patent No.: US 10,622,597 B2
(45) Date of Patent: Apr. 14, 2020

(54) BATTERY CELL HAVING OUTER EDGE SEALED PORTION WITH SEALED LINES AND BATTERY CELL SEALING APPARATUS FOR MANUFACTURE THEREOF

(71) Applicant: LG CHEM, LTD., Seoul (KR)

(72) Inventors: Jung Woo Yoo, Daejeon (KR); In Sung Uhm, Daejeon (KR); Je Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 565 days.

(21) Appl. No.: 15/121,914

(22) PCT Filed: Jan. 29, 2015

(86) PCT No.: PCT/KR2015/000950
§ 371 (c)(1),
(2) Date: Aug. 26, 2016

(87) PCT Pub. No.: WO2015/130017
PCT Pub. Date: Sep. 3, 2015

(65) Prior Publication Data
US 2017/0012252 A1    Jan. 12, 2017

(30) Foreign Application Priority Data
Feb. 27, 2014    (KR) .......................... 10-2014-0022981

(51) Int. Cl.
*H01M 2/08*    (2006.01)
*H01M 2/02*    (2006.01)
(Continued)

(52) U.S. Cl.
CPC ............. *H01M 2/08* (2013.01); *H01M 2/021* (2013.01); *H01M 2/026* (2013.01);
(Continued)

(58) Field of Classification Search
CPC ....................................................... H01M 2/08
(Continued)

(56) References Cited

U.S. PATENT DOCUMENTS

| 5,284,002 A | 2/1994 | Fowler et al. |
| 2010/0003594 A1 | 1/2010 | Hong et al. |

(Continued)

FOREIGN PATENT DOCUMENTS

| JP | 2000-200585 A | 7/2000 |
| JP | 2002-237279 A | 8/2002 |

(Continued)

OTHER PUBLICATIONS

European Search Report for Appl. No. 15754570.8 dated Jul. 10, 2017.
(Continued)

*Primary Examiner* — Michael H. Wilson
(74) *Attorney, Agent, or Firm* — Birch, Stewart, Kolasch & Birch, LLP

(57) ABSTRACT

Disclosed herein is a battery cell configured to have a structure in which an electrode assembly is mounted in a battery case made of a laminate sheet including a resin layer and a metal layer, and the battery case is provided with a sealed portion (an outer edge sealed portion), which is formed at the outer edge of a receiving part, in which the electrode assembly is mounted, by thermal welding in order to seal the battery case, wherein electrode terminals are located at an upper sealed portion, a lower sealed portion, or the upper sealed portion and the lower sealed portion, two or more sealed lines are formed in at least one of side sealed portions, which are adjacent to the upper sealed portion or the lower sealed portion, such that the sealed lines are spaced apart from each other and parallel to each other, the sealed lines are continuously formed from the outer edge
(Continued)

end of the upper sealed portion to the outer edge end of the lower sealed portion in the longitudinal direction of the battery case, and the outer edge sealed portion, in which the sealed lines are formed, is bent between the sealed lines at an angle of 30 to 180 degrees.

17 Claims, 8 Drawing Sheets

(51) Int. Cl.
*H01M 10/04* (2006.01)
*H01M 2/04* (2006.01)
*B29C 65/18* (2006.01)
*B29L 31/34* (2006.01)
*B29C 65/00* (2006.01)
*B29C 65/22* (2006.01)
*B29L 31/00* (2006.01)
*B29C 65/82* (2006.01)

(52) U.S. Cl.
CPC ....... *H01M 2/0237* (2013.01); *H01M 2/0262* (2013.01); *H01M 2/0267* (2013.01); *H01M 2/0277* (2013.01); *H01M 2/0285* (2013.01); *H01M 2/0287* (2013.01); *H01M 10/0404* (2013.01); *B29C 65/18* (2013.01); *B29C 65/223* (2013.01); *B29C 65/8253* (2013.01); *B29C 66/1122* (2013.01); *B29C 66/133* (2013.01); *B29C 66/232* (2013.01); *B29C 66/433* (2013.01); *B29C 66/72321* (2013.01); *B29C 66/81431* (2013.01); *B29C 66/8322* (2013.01); *B29L 2031/3468* (2013.01); *B29L 2031/7146* (2013.01); *H01M 2/0212* (2013.01); *H01M 2/0439* (2013.01); *H01M 2/0469* (2013.01); *H01M 2/0482* (2013.01); *H01M 2/0486* (2013.01)

(58) Field of Classification Search
USPC .......................................................... 429/177
See application file for complete search history.

(56) References Cited

U.S. PATENT DOCUMENTS

| | | | | |
|---|---|---|---|---|
| 2011/0117394 | A1* | 5/2011 | Hwang | H01M 2/0202 429/7 |
| 2012/0219851 | A1* | 8/2012 | Kim | H01M 2/0207 429/175 |

FOREIGN PATENT DOCUMENTS

| | | | |
|---|---|---|---|
| JP | 2006-40747 | A | 2/2006 |
| JP | 2006-244911 | A | 9/2006 |
| JP | 2009-224147 | A | 10/2009 |
| JP | 2013-157286 | A | 8/2013 |
| KR | 10-2010-0003557 | A | 1/2010 |
| KR | 10-2012-0102935 | A | 9/2012 |
| KR | 10-2013-0139026 | A | 12/2013 |

OTHER PUBLICATIONS

International Search Report for PCT/KR2015/000950 dated May 8, 2015.

* cited by examiner

[FIG. 1]
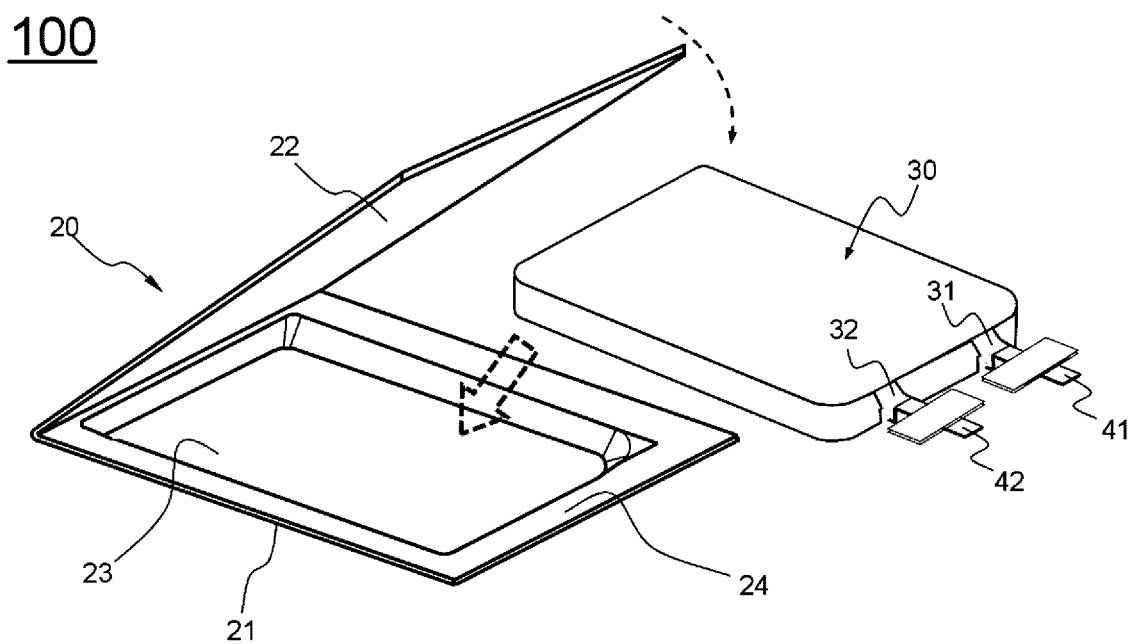

[FIG. 2]
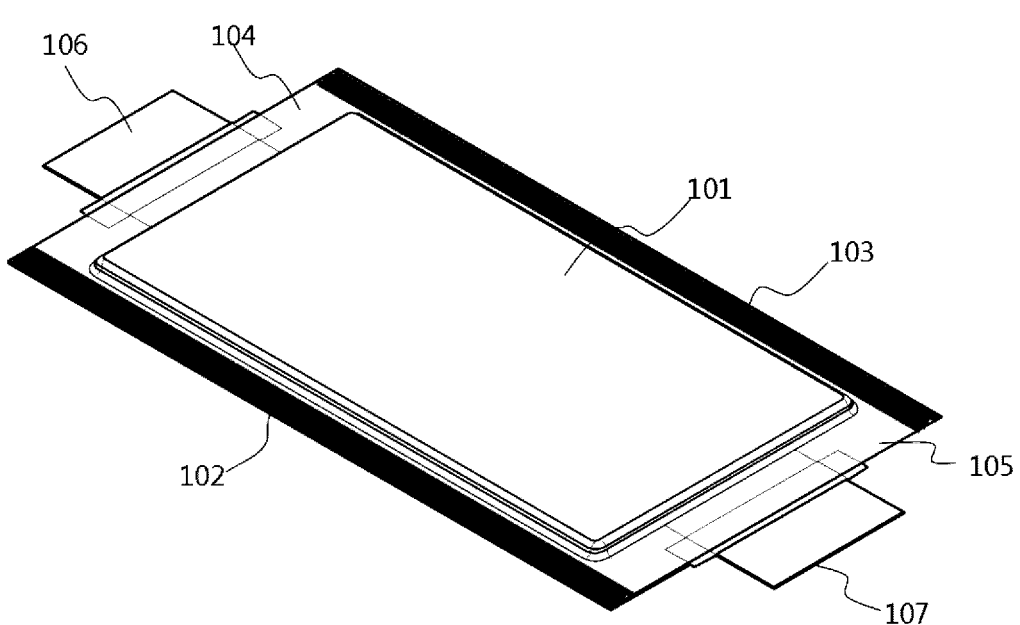

[FIG. 3]
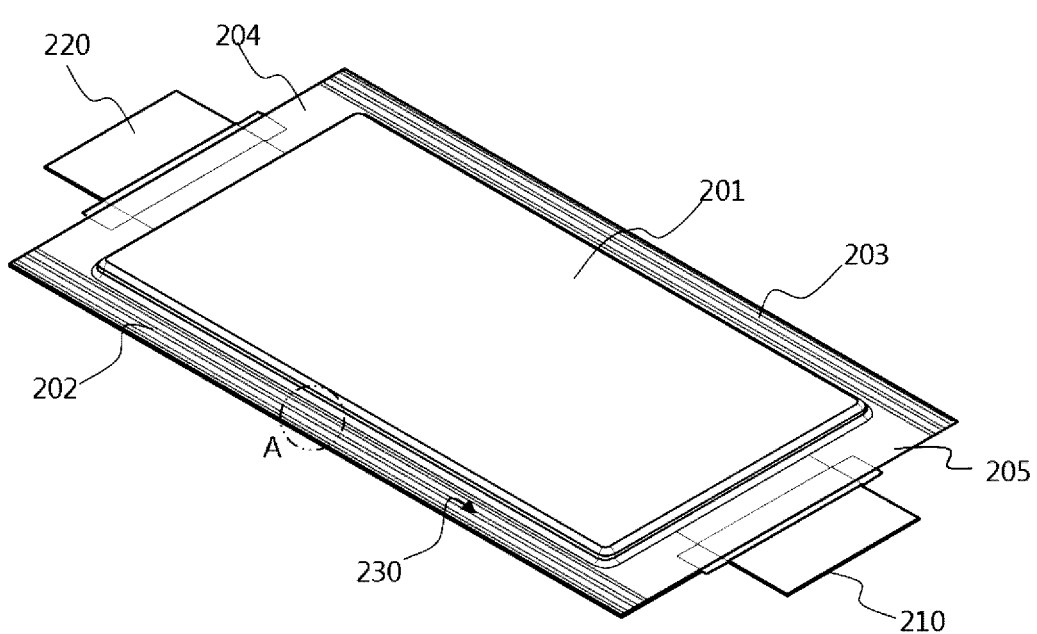

【FIG. 4】
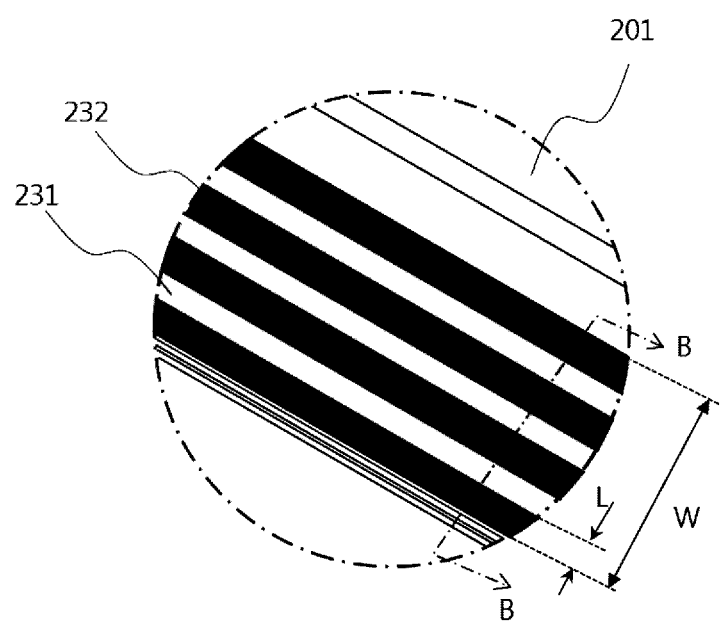
【FIG. 5】
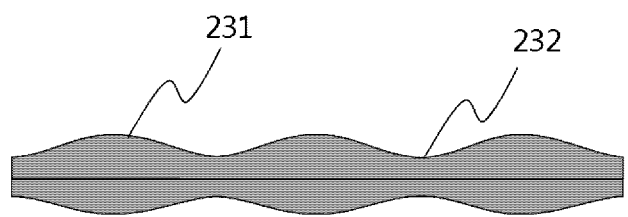

[FIG. 6]
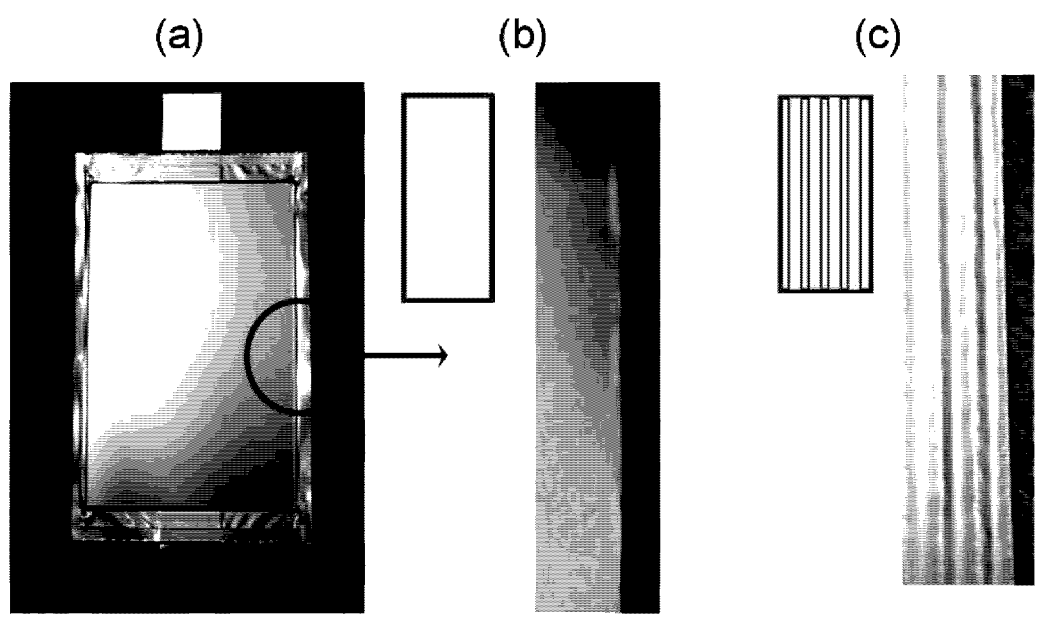

[FIG. 7]
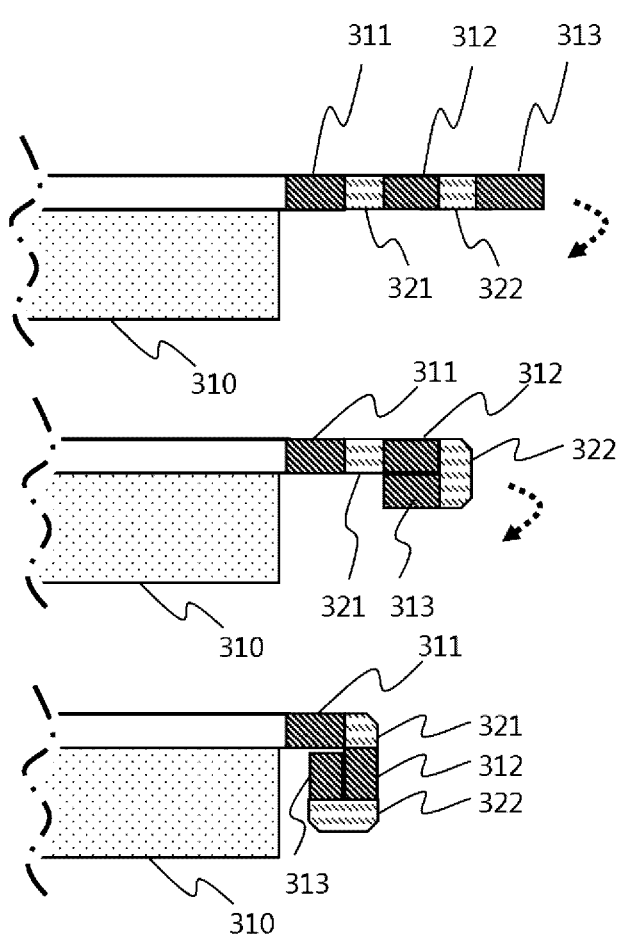

[FIG. 8]
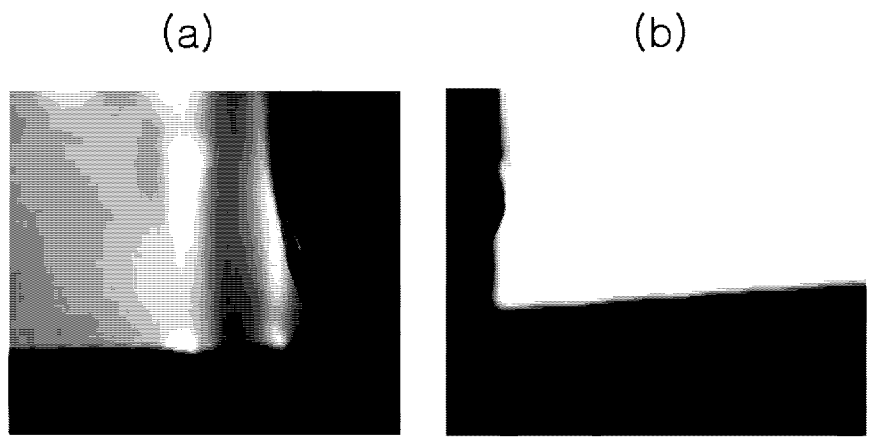
[FIG. 9]
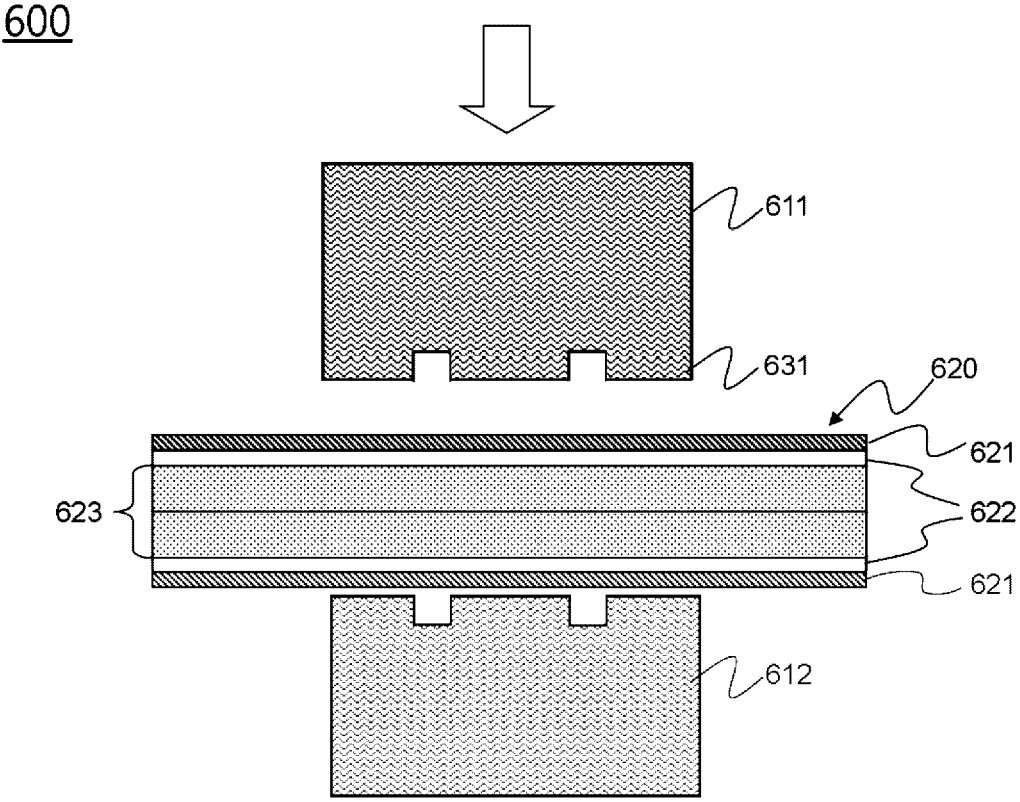

[FIG. 10]
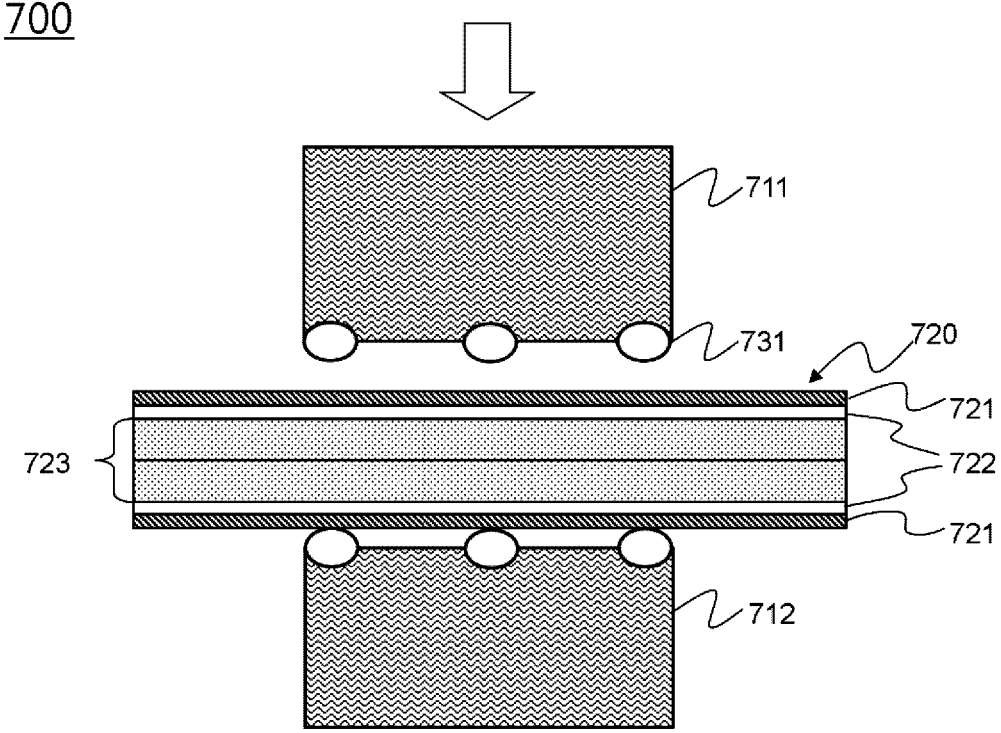

US 10,622,597 B2

BATTERY CELL HAVING OUTER EDGE SEALED PORTION WITH SEALED LINES AND BATTERY CELL SEALING APPARATUS FOR MANUFACTURE THEREOF

TECHNICAL FIELD

The present invention relates to a battery cell having an outer edge sealed portion with sealed lines and a battery cell sealing apparatus for manufacture thereof.

BACKGROUND ART

As mobile devices have been continually developed and the demand for such mobile devices has increased, the demand for secondary batteries has sharply increased as an energy source for the mobile devices. Among such secondary batteries is a lithium secondary battery having high energy density and high discharge voltage, into which much research has been carried out and which is now commercialized.

In terms of the shape of batteries, the demand for prismatic secondary batteries or pouch-type secondary batteries, which are thin enough to be applied to products, such as mobile phones, is very high. In terms of the material for batteries, meanwhile, the demand for lithium secondary batteries, such as lithium ion batteries and lithium ion polymer batteries, which exhibit high energy density, discharge voltage, and output stability, is very high.

Based on the shape thereof, secondary batteries may be classified into a cylindrical battery cell, a prismatic battery cell, and a pouch-type battery cell. Among these kinds of secondary batteries, much interest is currently focused on the pouch-type battery cell, which can be stacked with high integration, has high energy density per unit weight, can be manufactured at low cost, and can be easily modified.

The pouch-type battery cell may also be referred to as a lithium ion polymer battery because an electrode assembly impregnated with a lithium electrolyte in the state in which a positive electrode and a negative electrode are thermally welded to a separator is mainly used as an electrode assembly mounted in the pouch-type battery cell.

FIG. 1 is an exploded perspective view typically showing a general structure of a conventional representative pouch-type secondary battery.

Referring to FIG. 1, a pouch-type secondary battery 100 includes a stacked type electrode assembly 30 having pluralities of electrode tabs 31 and 32 protruding therefrom, two electrode leads 41 and 42 respectively connected to the electrode tabs 31 and 32, and a battery case 20, in which the stacked type electrode assembly 30 is received in a sealed state such that the electrode leads 41 and 42 are partially exposed outside of the battery case 20.

The battery case 20 includes a lower case 21 having a concave receiving part 23, in which the stacked type electrode assembly is located, and an upper case 22 for covering the lower case 21 such that the stacked type electrode assembly 30 is received in the battery case 20 in a sealed state. The upper case 22 and the lower case 21 are connected to each other by thermal welding in the state in which the stacked type electrode assembly 30 is mounted therein to form a sealed portion 24.

FIG. 2 is a perspective view showing the sealed state of a conventional pouch-type secondary battery 110 having an electrode assembly 101 mounted therein. The entirety of side sealed portions 102 and 103, as well as sealed portions 104 and 105, from which electrode tabs 106 and 107 protrude, are thermally welded.

In order to secure the hermetical sealability and insulation resistance of a pouch-type secondary battery, it is very important to seal the pouch-type secondary battery. In particular, for a middle or large-sized battery, which requires a large internal capacity, the size of a sealed portion formed at the battery is increased. To this end, it is necessary to perform an additional process. For example, in order to reduce the unnecessary space of the battery, the remaining area of the battery is bent after the battery is sealed. However, the mechanical processing of the sealed pouch is not easy.

Therefore, there is a strong necessity for technology that is capable of solving the above problems and, in addition, solving problems that may occur when a sealed portion of a pouch-type secondary battery is bent.

DISCLOSURE

Technical Problem

Therefore, the present invention has been made to solve the above problems, and other technical problems that have yet to be resolved.

As a result of a variety of extensive and intensive studies and experiments to solve the problems described above, the inventors of the present application have found that, in the case in which sealed lines are continuously formed from the outer edge end of an upper sealed portion to the outer edge end of a lower sealed portion in a longitudinal direction of a battery case, and non-welded portions or low welded portions are provided between the sealed lines such that the non-welded portions or the low welded portions are bent, as will be described hereinafter, it is possible to manufacture a battery cell configured to have an improved structure in which the side sealed portions, provided at the outer edge of the battery case, can be easily bent. The present invention has been completed based on these findings.

It is another object of the present invention to provide a battery cell sealing apparatus including sealing tools having linear protrusions for forming sealed lines such that the battery cell described above can be manufactured.

Technical Solution

In accordance with one aspect of the present invention, the above and other objects can be accomplished by the provision of a battery cell configured to have a structure in which an electrode assembly is mounted in a battery case made of a laminate sheet including a resin layer and a metal layer, and the battery case is provided with a sealed portion (an outer edge sealed portion), which is formed at the outer edge of a receiving part, in which the electrode assembly is mounted, by thermal welding in order to seal the battery case, wherein electrode terminals are located at an upper sealed portion, a lower sealed portion, or the upper sealed portion and the lower sealed portion, two or more sealed lines are formed in at least one of side sealed portions, which are adjacent to the upper sealed portion or the lower sealed portion, such that the sealed lines are spaced apart from each other and parallel to each other, the sealed lines are continuously formed from the outer edge end of the upper sealed portion to the outer edge end of the lower sealed portion in the longitudinal direction of the battery case, and the outer edge sealed portion, in which the sealed lines are formed, is bent between the sealed lines at an angle of 30 to 180 degrees.

That is, the battery cell according to the present invention is configured to have a structure in which two or more sealed lines are formed in the side sealed portions of the pouch-type battery case such that the sealed lines are spaced apart from each other and parallel to each other, and non-welded portions or low welded portions, located between the sealed lines, are bent such that the outer edge sealed portion of the battery case can be easily bent. Consequently, it is possible to accurately set the position of bent portions and to accurately form the bent portions, whereby it is possible to greatly reduce a process error. In addition, the sealed lines are located outside the receiving part of the battery case without being bent, whereby it is possible to reduce the volume of the battery cell.

In the case in which a pouch-type secondary battery made of a conventional laminate sheet is sealed, the entire area of a sealed portion is uniformly thermally welded, with the result that a polymer component of a sealant layer constituting the laminate sheet is excessively melted, and it is difficult to bend the sealed portion due to the hardened polymer component after the battery is sealed. The present invention solves the above-mentioned problems.

The battery cell according to the present invention is a battery cell configured to have a structure in which a sealed portion is formed at the outer edge of a receiving part, in which an electrode assembly is mounted, by thermal welding in order to seal a battery case, and sealed lines are formed so as to be parallel to the outer edge of the receiving part. Consequently, the battery cell is configured to have a rectangular plate-shaped structure.

In order to prevent the permeation of moisture into the battery case, to prevent the leakage of an electrolyte from the battery case, and to secure the airtightness of the battery case when sealing the battery case, the battery case is configured to have a sheet type structure including a resin layer and a metal layer. In a concrete example, the battery case may be made of a laminate sheet including a metal layer and a resin layer. The battery case may include a first case having the receiving part, in which the electrode assembly is mounted, formed therein and a second case for covering the receiving part, an outer edge of the second case being thermally welded to an outer edge of the first case in order to seal the battery case. In addition, the first case and the second case may be configured as separate members or as a single member configured to have a structure in which one end of the first case is coupled to a corresponding end of the second case. A representative example of the laminate sheet may be an aluminum laminate sheet having resin layers formed at opposite outer surfaces thereof.

In the battery cell according to the present invention, the sealed lines are formed at the side sealed portions, provided at the outer edge of the battery case. The distance between the sealed lines may be uniform such that the sealed portions can be easily bent between the sealed lines. The shape of each of the sealed lines is not particularly restricted. For example, each of the sealed lines may be formed in the shape of a straight line that is parallel to the outer edge of the receiving part.

The sealed lines may have the same width. In the case in which the sealed lines have the same width as described above, it is possible to accurately set the position of bent portions and to accurately form the bent portions, whereby it is possible to greatly reduce a process error. In addition, it is possible to easily evaluate the uniformity in area of the sealed portion by checking the number of sealed lines when the quality of the battery cell is checked after the battery cell is manufactured, whereby it is possible to improve the accuracy and rapidity of the process.

Meanwhile, the sealed portion is located so as to face the side of the receiving part after the sealed portion is bent. For this reason, the width of the sealed lines may be less than the height of the receiving part. In a concrete example, the width of the inside sealed line may be greater than the width of the outside sealed line. Alternatively, the width of the outside sealed line may be greater than the width of the inside sealed line.

More specifically, the sealed lines may have different widths in consideration of the number of times the battery cell is bent, the direction in which the battery cell is bent, and the thickness of the laminate sheet. The width of each of the sealed lines may be 10% to 45% of the width of the outer edge sealed portion in which the sealed lines are formed. If the width of each of the sealed lines is less than 10% of the width of the sealed portion, the sealing strength is lowered, with the result that the safety of the battery cell is reduced, which is not desirable. If the width of each of the sealed lines is greater than 45% of the width of the sealed portion, it is difficult to bend the sealed portion, with the result that it is not possible to reduce the volume of the battery cell, which is also not desirable.

In the battery cell according to the present invention, the distance between the sealed lines may be less than the width of each of the sealed lines. Specifically, the distance between the sealed lines may be 10% to 100% of the average width of the sealed lines. If the distance between the sealed lines is less than 10% of the average width of the sealed lines, it is difficult to bend the sealed portion due to the thickness of the laminate sheet, which is not desirable. If the distance between the sealed lines is greater than 100% of the average width of the sealed lines, it is difficult to accurately set the position of bent portions and to accurately form the bent portions, which is also not desirable.

Each of the sealed lines is a thermally welded portion, and the sealed portion is bent between the sealed lines. Non-welded portions may be formed between the sealed lines. That is, the sealed lines and the non-welded portions may be alternately arranged. The thickness of the vertical end of each of the sealed lines is less than the thickness of each of the non-welded portions since the sealed lines are thermally welded in the state in which pressure is applied to the sealed lines.

In another concrete example, the inner sealant layer of the battery case is melted due to high temperature and pressure during the thermal welding process for manufacturing the battery cell according to the present invention. The molten inner sealant layer flows to the portions between the sealed lines, with the result that the portions between the sealed lines may be welded at a relatively low strength. Consequently, low welded portions, having a lower thermally welded extent than the sealed lines, may be formed between the sealed lines.

More specifically, the low welded portions may have a thermally welded extent that is 5% to 90% of the thermally welded extent of the sealed lines.

In the case in which the thermally welded extent of the low welded portions is greater than 90% of the thermally welded extent of the sealed lines, it is difficult to bend the outer edge sealed portion at the low welded portions between the sealed lines, which is not desirable.

In another concrete example, in order to prevent the reduction of sealability of the sealed lines due to the formation of the low welded portions, it is necessary to form the sealed lines at a higher welding strength. Consequently, the thermal welding temperature applied to the sealed lines may be higher than the thermal welding temperature applied to the low welded portions.

In the battery cell according to the present invention, the number of sealed lines may be 2 or more in consideration of the purpose of use of the battery cell and the target in which the battery cell is to be used. In order to prevent the reduction of sealability of the battery cell while achieving safety of the battery cell through prevention of leakage of an electrolyte, the sealed lines may be formed in at least the outer edge of the receiving part and the outermost region of the outer edge of the sealed portion.

In a concrete example, the sealed lines may include a first sealed line, a second sealed line, and a third sealed line, which are sequentially arranged in the sequence in which the sealed lines are adjacent to the receiving part. In addition, a first bent portion may be provided between the first sealed line and the second sealed line, and a second bent portion may be provided between the second sealed line and the third sealed line.

The second bent portion may be bent such that the third sealed line faces the second sealed line. Specifically, the second bent portion may be bent by 180 degrees toward the receiving part such that the third sealed line faces the second sealed line.

In addition, the sealed portion may be bent twice or more in order to reduce the volume of the battery cell. In the state in which the second bent portion is bent, the first bent portion may be bent such that one surface of the third sealed line, opposite to the other surface of the third sealed line facing the second sealed line, faces the receiving part.

Consequently, it is possible to manufacture a battery cell having a more compact structure. In addition, it is possible to accurately set the position of the bent portions and to accurately form the bent portions, whereby it is possible to greatly reduce a process error.

In accordance with another aspect of the present invention, there is provided an apparatus for sealing the outer edge of a battery cell, the apparatus including an upper sealing tool for pressing downward the upper surface of a to-be-sealed portion provided at the outer edge of a battery case while applying a high temperature thereto and a lower sealing tool for supporting the lower surface of the to-be-sealed portion provided at the outer edge of the battery case, wherein two or more linear protrusions for forming sealed lines in an outer edge sealed portion are formed on at least one of the upper and lower sealing tools.

In the sealing apparatus having the above structure, the lower sealing tool may also apply heat to the lower surface of the to-be-sealed portion, in addition to the upper sealing tool, which applies heat to the upper surface of the to-be-sealed portion. During thermal welding of the battery case, the sealed lines may be formed in the outer edge sealed portion of the battery cell so as to correspond to the shape of the protrusions formed on the sealing tools, whereby it is possible to provide a battery cell configured to have a structure in which the sealed portion is easily bent between the sealed lines.

Ends of the linear protrusions, which will come into contact with the to-be-sealed portion provided at the outer edge of the battery case, may be flat or curved when viewed in vertical section. In order to secure the sealability of the sealed portion, the ends of the linear protrusions may be flat. In order to prevent low welded portions from being formed due to the melting and flow of an inner sealant layer, the ends of the linear protrusions may be curved.

In accordance with another aspect of the present invention, there is provided an apparatus for sealing the outer edge of a battery cell, the apparatus including an upper sealing tool for pressing downward the upper surface of a to-be-sealed portion provided at the outer edge of a battery case while applying a high temperature thereto and a lower sealing tool for supporting the lower surface of the to-be-sealed portion provided at the outer edge of the battery case, wherein two or more linear heating wires for forming sealed lines in an outer edge sealed portion are embedded in at least one of the upper and lower sealing tools.

In the sealing apparatus having the above structure, the lower sealing tool may also apply heat to the lower surface of the to-be-sealed portion, in addition to the upper sealing tool, which applies heat to the upper surface of the to-be-sealed portion. The sealing apparatus according to this embodiment may have the same objects and effects as the sealing apparatus according to the previous embodiment, in which the linear protrusions are formed on the sealing tools. Additionally, in the sealing apparatus according to this embodiment, the linear heating wires are embedded in the same regions of the sealing tools as the regions of the sealing tools on which the linear protrusions are formed in the previous embodiment. In this case, it is possible to perform thermal welding only at the sealed lines at a high temperature and to more easily set and adjust the thermal welding temperature. In addition, only the heating wires may be provided in the sealing tools, without forming the linear protrusions, whereby it is possible to more easily achieve the effects of the present invention.

In accordance with other aspects of the present invention, there are provided a battery module including the battery cell as a unit cell and a battery pack including the battery module.

In accordance with a further aspect of the present invention, there is provided a device including the battery pack as a power source.

Specifically, the battery pack may be used as a power source for a device requiring the ability to withstand high temperature, a long cycle, and high rate characteristics, etc. A specific example of such a device may be selected from among a mobile device, such as a smart phone, a mobile phone, a laptop computer, a tablet computer, a power tool driven by a battery-based motor, an electric automobile, such as such as an electric vehicle (EV), a hybrid electric vehicle (HEV), or a plug-in hybrid electric vehicle (PHEV), an electric two-wheeled vehicle, such as an electric bicycle (E-bike) or an electric scooter (E-scooter), an electric golf cart, and a power storage system. However, the present invention is not limited thereto.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing a conventional representative pouch-type secondary battery;

FIG. 2 is a perspective view showing the sealed state of a conventional pouch-type secondary battery;

FIG. 3 is a see-through plan view showing a battery cell having sealed lines according to an embodiment of the present invention;

FIG. 4 is an enlarged view showing region A of FIG. 3;

FIG. 5 is a vertical sectional view taken along line B-B of FIG. 4;

FIG. 6 is a photograph showing a conventional pouch-type secondary battery, an enlarged photograph showing a sealed portion of the conventional pouch-type secondary battery, and an enlarged photograph showing a sealed portion of a battery cell according to an embodiment of the present invention;

FIG. 7 is a partial front view showing a process of bending a pouch-type battery cell according to an embodiment of the present invention;

FIG. 8 is views showing a conventional pouch-type secondary battery and a battery cell according to an embodiment of the present invention for comparison therebetween after being bent;

FIG. 9 is a front view showing a sealing apparatus according to an embodiment of the present invention; and FIG. 10 is a front view showing a sealing apparatus according to another embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 3 shows a battery cell having sealed lines according to an embodiment of the present invention.

A pouch-type battery cell configured to have a structure in which electrode terminals, constituted by electrode tabs and electrode leads, which are connected to each other, are formed at opposite ends thereof is shown in FIG. 3. Of course, the present invention may be applied to a pouch-type battery cell configured to have a structure in which electrode terminals are formed at one end thereof.

Referring to FIG. 3, a battery cell 200 according to the present invention is configured to have a structure in which a sealed portion is formed at the outer edge of a receiving part 201, in which an electrode assembly is mounted, by thermal welding in order to seal a battery case, electrode terminals 210 and 220 are located at an upper sealed portion 204 and a lower sealed portion 205, and two or more sealed lines 230 are formed in side sealed portions 202 and 203, which are adjacent to the upper sealed portion 204 and the lower sealed portion 205, such that the sealed lines 230 are spaced apart from each other and parallel to each other. Specifically, the sealed lines 230 are continuously formed from the outer edge end of the upper sealed portion 204 to the outer edge end of the lower sealed portion 205 in the longitudinal direction of the battery case. Considering that it is an object of the present invention to provide a battery cell configured such that the battery cell can be easily bent between the sealed lines, the sealed lines may extend from the outer edge end of the upper sealed portion to the outer edge end of the lower sealed portion, rather than extend so as to have a length equivalent to the length of the receiving part.

FIG. 4 is an enlarged view showing region A of FIG. 3.

Referring to FIG. 4, a plurality of sealed lines is formed in the side sealed portion located at the outer edge of the receiving part 201 of the battery case such that each of the sealed lines extends in a straight line. Thermally welded portions 232, which define the sealed lines, and non-welded portions 231 are alternately arranged. The non-welded portions may be portions that are not welded at all. Alternatively, the non-welded portions may be low welded portions having a lower thermally welded extent than the sealed lines.

In addition, the sealed lines may have the same width L. Alternatively, the sealed lines may have different widths. For example, the width of the inside sealed line, which is formed adjacent to the receiving part 201, may be greater than the width of the outside sealed line. Alternatively, the width of the outside sealed line may be greater than the width of the inside sealed line. In the case in which the sealed lines have the same width, it is possible to easily evaluate the uniformity in area of the sealed portion by checking the number of sealed lines when the quality of the battery cell is checked after the battery cell is manufactured. However, the sealed lines may have different widths in consideration of the number of times the battery cell is bent based on the thickness of a laminate sheet and the width of the sealed portion.

The width of each of the sealed lines may be appropriately selected so as to be equivalent to 10% to 45% of the width W of each of the side sealed portions in which the sealed lines are formed.

Meanwhile, the sealed portion may be bent between the sealed lines. Consequently, these bent portions may be relatively thin. For example, the distance between the sealed lines (the distance between L and L), which is the width of each of the non-welded portions or the low welded portions, may be less than the width of each of the sealed lines. Specifically, the distance between the sealed lines may be equivalent to 10% to 100% of the average width of the sealed lines.

FIG. 5 is a vertical sectional view taken along line B-B of FIG. 4. It can be seen from FIG. 5 that the thickness of each of the thermally welded portions 232, i.e. the sealed lines, is relatively small when viewed in vertical section of the outer edge of the sealed portion, whereas the thickness of each of the non-welded portions or the low welded portions 231, which are located between the respective sealed lines, is relatively large when viewed in vertical section of the outer edge of the sealed portion.

FIG. 6 is a photograph showing a conventional pouch-type secondary battery (a), an enlarged photograph showing a sealed portion of the conventional pouch-type secondary battery (b), and an enlarged photograph showing a sealed portion of a battery cell according to an embodiment of the present invention (c). Referring to FIG. 6(b), which is an enlarged photograph showing the sealed portion of the conventional pouch-type secondary battery, the surface of the sealed portion is shown as being smooth. Referring to FIG. 6(c), which is an enlarged photograph showing the sealed portion of the battery cell according to the present invention (c), non-welded portions or low welded portions are shown as being repeatedly formed such that the non-welded portions or low welded portions and sealed lines are alternately arranged.

FIG. 7 is a partial front view showing a process of bending a pouch-type battery cell according to an embodiment of the present invention.

Referring to FIG. 7, sealed lines formed in a side sealed portion of the battery cell include a first sealed line 311, a second sealed line 312, and a third sealed line 313, which are sequentially arranged in the sequence in which the sealed lines are adjacent to a receiving part 310. A first bent portion 321 is provided between the first sealed line 311 and the second sealed line 312, and a second bent portion 322 is provided between the second sealed line 312 and the third sealed line 313.

The second bent portion 322 may be bent such that the third sealed line 313 faces the second sealed line 312. In the state in which the second bent portion 322 is bent, the first bent portion 321 may be bent such that one surface of the third sealed line 313, which is opposite the other surface of the third sealed line 313 facing the second sealed line 312, faces the receiving part 330. As described above, the side sealed portion may be bent once, twice, or more, thereby preventing an increase in the volume of the battery cell.

FIG. 8 is views showing a conventional pouch-type secondary battery (a) and a battery cell according to an embodiment of the present invention (b) for comparison therebetween. In the case in which sealed lines are formed such that only a portion of the sealed portion is thermally welded as in the present invention, the sealed portion may be uniformly bent in a compact fashion at the step of bending the battery cell.

FIGS. 9 and 10 are views showing sealing apparatuses according to embodiments of the present invention.

Referring first to FIG. 9, a sealing apparatus 600, which seals the outer edge of a battery cell, includes an upper sealing tool 611 and a lower sealing tool 612. The upper sealing tool 611 presses downward the upper surface of a to-be-sealed portion 620 provided at the outer edge of a battery case while applying a high temperature thereto, and the lower sealing tool 612 supports the lower surface of the to-be-sealed portion 620. In addition, the lower sealing tool 612 may apply heat to the lower surface of the to-be-sealed portion 620. Two or more linear protrusions 631 are formed on at least one of the upper and lower sealing tools 611 and 612. The linear protrusions 631 may protrude toward the to-be-sealed portion 620 provided at the outer edge of the battery case. The ends of the linear protrusions 631, which will come into contact with the to-be-sealed portion 620 provided at the outer edge of the battery case, may be flat or curved when viewed in vertical section. In the case in which the outer edge of the battery cell is sealed using the sealing apparatus 600, the outer edge of the battery cell is sealed at the regions of the to-be-sealed portion of the battery case that contact the protrusions due to melting of a sealant layer 623 constituting each laminate sheet, which further includes a resin layer 621 and a metal layer 622 in addition to the sealant layer 623.

Referring to FIG. 10, a sealing apparatus 700 includes an upper sealing tool 711 and a lower sealing tool 712. The upper sealing tool 711 presses downward the upper surface of a to-be-sealed portion 720 provided at the outer edge of a battery case while applying a high temperature thereto, and the lower sealing tool 712 supports the lower surface of the to-be-sealed portion 720. In addition, the lower sealing tool 712 may apply heat to the lower surface of the to-be-sealed portion 720. Two or more linear heating wires 731 are embedded in at least one of the upper and lower sealing tools 711 and 712. Although the heating wires 731 are embedded in the sealing tool, the heating wires 731 may be located on the surface of the sealing tool in order to form sealed lines having further improved safety by applying a high temperature to the sealed lines.

In the case in which the outer edge of the battery cell is sealed using the sealing apparatus 700, the outer edge of the battery cell is sealed at the regions of the to-be-sealed portion of the battery case that contact the heating wires due to melting of a sealant layer 723 constituting a laminate sheet, which further includes a resin layer 721 and a metal layer 722 in addition to the sealant layer 723.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is configured to have a structure in which two or more sealed lines are formed in at least one of side sealed portions, which are adjacent to an upper sealed portion and a lower sealed portion, at which electrode terminals are located such that the sealed lines are spaced apart from each other and parallel to each other, and the sealed portion is bent at non-welded portions located between the sealed lines while other portions are located outside a receiving part of a battery case without being bent, whereby it is possible to easily bend the sealed portion and to reduce the volume of the battery cell.

In addition, since the sealed portion is easily bent between the sealed lines, it is possible to accurately set the position of bent portions and to accurately form the bent portions, whereby it is possible to greatly reduce a process error. Furthermore, it is possible to easily evaluate the uniformity in area of the sealed portion by checking the number of sealed lines when the quality of the battery cell is checked after the battery cell is manufactured, whereby it is possible to improve the accuracy and rapidity of the process.

The invention claimed is:

1. A battery cell, comprising:
a battery case made of a laminate sheet comprising a resin layer and a metal layer, the battery case having a receiving part; and
an electrode assembly mounted in the battery case,
wherein the battery case is provided with a sealed portion formed at an outer edge of the receiving part to seal the battery case,
wherein electrode terminals are located at an upper sealed portion of the battery case, or a lower sealed portion of the battery case, or the upper sealed portion and the lower sealed portion of the battery case,
wherein two or more sealed lines joining two layers of the battery case to each other are formed in at least one side sealed portion, which is adjacent to the upper sealed portion or the lower sealed portion, such that the sealed lines are spaced apart from each other and parallel to each other,
wherein one or more non-welded portions are located between the sealed lines or wherein one or more low welded portions, having a lower thermally welded extent than the sealed lines, are located between the sealed lines,
wherein each sealed line is continuously formed from an outer edge end of the upper sealed portion to an outer edge end of the lower sealed portion in a longitudinal direction of the battery case, and
wherein the at least one side sealed portion, in which the sealed lines are formed, is bent between the sealed lines at an angle of 30 to 180 degrees.

2. The battery cell according to claim 1, wherein the battery cell is configured to have a rectangular plate-shaped structure.

3. The battery cell according to claim 1, wherein the battery case comprises a first case having the receiving part, in which the electrode assembly is mounted, formed therein and a second case for covering the receiving part, an outer edge of the second case being thermally welded to an outer edge of the first case in order to seal the battery case.

4. The battery cell according to claim 3, wherein the first case and the second case are configured as separate members or as a single member, in which one end of the first case is coupled to a corresponding end of the second case.

5. The battery cell according to claim 1, wherein each of the sealed lines is formed in a shape of a straight line that is parallel to an outer edge of the receiving part adjacent thereto when viewed in a plan view.

6. The battery cell according to claim 1, wherein the sealed lines have the same width.

7. The battery cell according to claim 1, wherein a width of an inside sealed line is greater than a width of an outside sealed line.

8. The battery cell according to claim 1, wherein a width of an outside sealed line is greater than a width of an inside sealed line.

9. The battery cell according to claim 1, wherein a width of each of the sealed lines is 10% to 45% of a width of the outer edge sealed portion in which the sealed lines are formed.

10. The battery cell according to claim 1, wherein a distance between the sealed lines is 10% to 100% of an average width of the sealed lines.

11. The battery cell according to claim 1, wherein the low welded portions have a thermally welded extent that is 5% to 90% of the thermally welded extent of the sealed lines.

12. The battery cell according to claim 1, wherein a thermal welding temperature applied to the sealed lines is higher than a thermal welding temperature applied to the low welded portions.

13. The battery cell according to claim 1, wherein the sealed lines comprise a first sealed line, a second sealed line, and a third sealed line, which are sequentially arranged in a sequence in which the sealed lines are adjacent to the receiving part, and wherein a first bent portion is provided between the first sealed line and the second sealed line, and a second bent portion is provided between the second sealed line and the third sealed line.

14. The battery cell according to claim 13, wherein the second bent portion is bent such that the third sealed line faces the second sealed line.

15. The battery cell according to claim 14, wherein, in a state in which the second bent portion is bent, the first bent portion is bent such that one surface of the third sealed line, opposite the other surface of the third sealed line facing the second sealed line, faces the receiving part.

16. A device comprising a battery cell according to claim 1.

17. The device according to claim 16, wherein the device is a mobile device, a tablet computer, a laptop computer, a power tool, an electric vehicle, a hybrid electric vehicle, a plug-in hybrid electric vehicle, or a power storage apparatus.

* * * * *